US011157952B2

(12) United States Patent
Sohum et al.

(10) Patent No.: US 11,157,952 B2
(45) Date of Patent: Oct. 26, 2021

(54) METHOD AND SYSTEM FOR CREATING DECENTRALIZED REPOSITORY OF FRAUD IPS AND PUBLISHERS USING BLOCKCHAIN

(71) Applicant: Affle (India) Limited, Mumbai (IN)

(72) Inventors: Anuj Khanna Sohum, Singapore (SG); Charles Yong Jien Foong, Singapore (SG); Kulpreet Singh, New Delhi (IN); Ayush Aggarwal, Gurgaon (IN); Anurag Singh, Gurgaon (IN)

(73) Assignee: Affle (India) Limited, Mumbai (IN)

( * ) Notice: Subject to any disclaimer, the term of this patent is extended or adjusted under 35 U.S.C. 154(b) by 273 days.

(21) Appl. No.: 16/399,565

(22) Filed: Apr. 30, 2019

(65) Prior Publication Data
US 2019/0333097 A1 Oct. 31, 2019

(30) Foreign Application Priority Data

Apr. 30, 2018 (IN) .............................. 201821016228

(51) Int. Cl.
*G06Q 30/00* (2012.01)
*G06Q 30/02* (2012.01)
*G06F 16/27* (2019.01)
*H04W 12/12* (2021.01)

(52) U.S. Cl.
CPC ......... *G06Q 30/0248* (2013.01); *G06F 16/27* (2019.01); *H04W 12/12* (2013.01)

(58) Field of Classification Search
None
See application file for complete search history.

(56) References Cited

U.S. PATENT DOCUMENTS

| | | | |
|---|---|---|---|
| 2016/0094573 A1* | 3/2016 | Sood | H04L 63/0428 713/156 |
| 2017/0178072 A1* | 6/2017 | Poornachandran | G06Q 20/3227 |
| 2018/0020002 A1* | 1/2018 | Duca | G06F 21/572 |

* cited by examiner

*Primary Examiner* — Scott C Anderson
(74) *Attorney, Agent, or Firm* — Kolisch Hartwell, P.C.

(57) ABSTRACT

The present disclosure provides a method and system for creating decentralized repository of fraud IP and publishers using block chain. The block chain network creates a central repository for decentralized shared ledger. The block chain network adds a ledger in decentralized shared ledger for each interaction on an application. In addition, the block chain network authorizes at least one of a plurality of stakeholders to access the decentralized shared ledger after receiving a request from at least one of the plurality of stakeholders. Further, the block chain network analyzes the interaction and past data received from a plurality of stake holders. Furthermore, the block chain network blocks device IPs, device Id's, device type and the publishers mentioned in blacklist of the decentralized shared ledger.

19 Claims, 4 Drawing Sheets

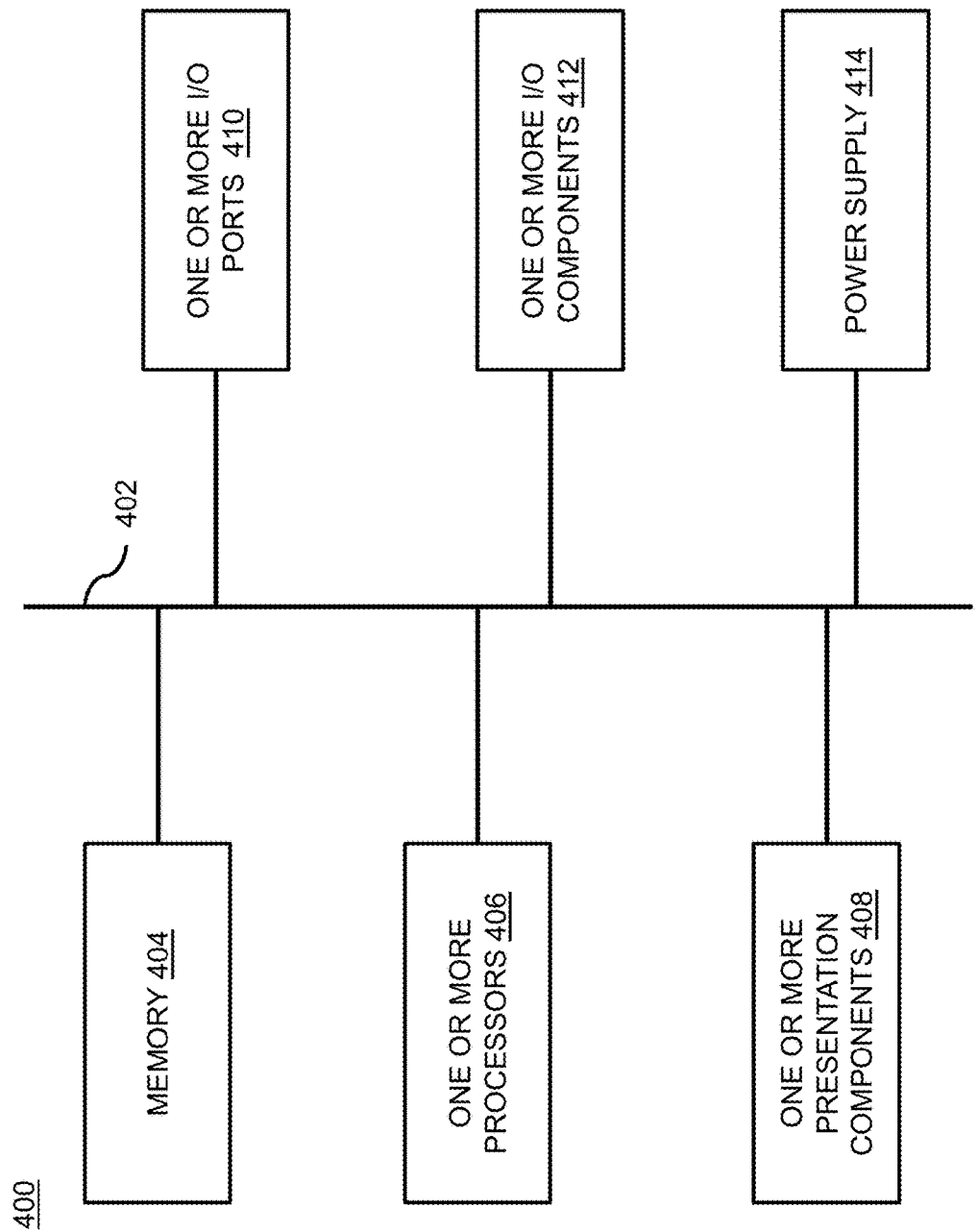

METHOD AND SYSTEM FOR CREATING DECENTRALIZED REPOSITORY OF FRAUD IPS AND PUBLISHERS USING BLOCKCHAIN

TECHNICAL FIELD

The present disclosure relates to the field of fraud detection systems and, in particular, relates to a method and system for creating a decentralized repository of fraud IPs and publishers accessible in real time.

INTRODUCTION

With the advancements in technology over the last few years, users have predominantly shifted towards smartphones for accessing multimedia content. Nowadays, users access content through a number of mobile applications available for download through various online application stores. Businesses (Advertisers) have started focusing on generating revenue by targeting consumers through these mobile applications. In addition, businesses have started investing heavily on doing business through these mobile applications. Moreover, businesses (publishers and/or advertising networks) have started developing advertisement capable applications for serving advertisements through these mobile applications. These advertisements are published in real time or fixed placements through these mobile applications and watched by the users. The advertisers are benefited in terms of internet traffic generated on clicking, taking action like installing or on watching these advertisements. However, certain online publishers and advertising networks working with these publishers take undue advantage of this in order to generate high revenues. These online publishers and advertising networks employ fraudulent techniques in order to generate clicks, or increasing actions like increasing number of application installs for the advertisers through fraudulent means. This results in a loss of advertisers marketing budget spent as many times these publishers claim a normal user-initiated action (Organic action, e.g. Organic Install) as one initiated by them or at times the clicks or application installs are not driven by humans at all and instead by bots. There is a consistent need to stop publishers from performing such types of click fraud and transaction fraud.

SUMMARY

In a first example, a computer system is provided. The computer system includes one or more processors and a memory. The memory is coupled to the one or more processors. The memory stores instructions. The instructions are executed by the one or more processors. The execution of instructions causes the one or more processors to perform a method for creating decentralized repository of fraud IP and publishers using block chain. The method includes a first step of creating a central repository for decentralized shared ledger at a block chain network. The method includes another step of adding a ledger in decentralized shared ledger for each interactions on an application in real time at the block chain network. The method includes another step of authorizing at least one of the plurality of stakeholders to access the decentralized shared ledger to the block chain network. The method includes yet another step of analyzing the interaction and past data received from the plurality of stake holders. The method includes yet another step of blocking device IPs, device Id's, device type and the publishers mentioned in blacklist of the decentralized shared ledger at the block chain network. The central repository includes blacklist and whitelist. The blacklist and the whitelist are created based on the data collected from a plurality of stakeholders related to fraud. The plurality of stakeholders includes advertisers, advertising networks, publishers and third party data providers. Each of the interactions is associated with one or more advertisements displayed on one or more media devices. The addition is done based on a smart contract. The authorization is done after receiving a request from at least one of the plurality of stakeholders. The authorization is done based on a unique root key. The analysis is done to identify the fraud behavior. The analysis is done in real time. The blacklist is created based on scoring of the publishers in real time.

In an embodiment of the present disclosure, the interactions includes application size, time to download, time to run, redirection time, click to install, click to run, user click time, device load time, time to install, network download time, application usage time, application idle time, application opening time, number of click, past revenue of publisher, number of transaction, time stamp, location of click, interaction data and number of install.

In an embodiment of the present disclosure, the unique root key is specific to at least one of the plurality of stakeholders. The unique root key is used for authorization of each of the plurality of stakeholders.

In an embodiment of the present disclosure, the decentralized shared ledger comprises one of private ledger and public ledger.

In an embodiment of the present disclosure, the block chain network scores the publishers based on the analysis. The scoring is done to specify whether the publishers are using fraud means. The scoring is compared with the predefined threshold in order to mark the publishers in the whitelist and the blacklist.

In an embodiment of the present disclosure, the blacklist and the whitelist comprises device IPs, device Id's, device type and the publishers.

In an embodiment of the present disclosure, the block chain network verifies data received from the plurality of stakeholders with the past data and the interaction at the block chain network. The block chain network adds a ledger in the decentralized shared ledger in the block chain network. The verification is done after receiving a request from the plurality of stakeholders to add the one or more users associated with the device IPs, the device Id's, the device type or the publishers in the blacklist. The addition to the decentralized shared ledger is done based on the smart contracts after verifying that the device IPs, the device Id's, the device type or the publishers is fraud. The addition is done in real time.

In an embodiment of the present disclosure, the block chain network rewards at least one of the plurality of stakeholders for providing data related to fraud which has been verified and added to the blacklist of the decentralized shared ledger. The reward is updated timely in real time.

In a second example, a computer-implemented method is provided. The computer-implemented method creates decentralized repository of fraud IP and publishers using block chain. The computer-implemented method includes a first step of creating a central repository for decentralized shared ledger at a block chain network with a processor. The computer-implemented method includes another step of adding a ledger in decentralized shared ledger for each interactions on an application in real time at the block chain network with the processor. The computer-implemented method includes another step of authorizing at least one of the plurality of stakeholders to access the decentralized shared ledger to the block chain network with the processor. The computer-implemented method includes yet another step of analyzing the interaction and past data received from the plurality of stake holders at the block chain network with the processor. The computer-implemented method includes yet another step of blocking device IPs, device Id's, device type and the publishers mentioned in blacklist of the decentralized shared ledger at the block chain network with the processor. The central repository includes blacklist and whitelist. The blacklist and the whitelist are created based on the data collected from a plurality of stakeholders related to fraud. Each of the interactions is associated with one or more advertisements displayed on one or more media devices. The addition is done based on a smart contract. The authorization is done after receiving a request from at least one of the plurality of stakeholders. The authorization is done based on a unique root key. The analysis is done to identify the fraud behavior. The analysis is done in real time. The blacklist is created based on scoring of the publishers in real time.

In an embodiment of the present disclosure, the interactions includes application size, time to download, time to run, redirection time, click to install, click to run, user click time, device load time, time to install, network download time, application usage time, application idle time, application opening time, number of click, past revenue of publisher, number of transaction, time stamp, location of click, interaction data and number of install.

In an embodiment of the present disclosure, the plurality of stakeholders includes advertisers, advertising networks, the publishers and a third party data providers.

In an embodiment of the present disclosure, the unique root key is specific to at least one of the plurality of stakeholders. The unique root key is used for authorization of each of the plurality of stakeholders.

In an embodiment of the present disclosure, the decentralized shared ledger includes one of private ledger and public ledger.

In an embodiment of the present disclosure, the block chain network scores the publishers based on the analysis at the block chain network with the processor. The scoring is done to specify whether the publishers are using fraud means. The scoring is compared with the pre-defined threshold in order to mark the publishers in the whitelist and the blacklist.

In an embodiment of the present disclosure, the blacklist and the whitelist includes device IPs, device Id's, device type and the publishers.

In an embodiment of the present disclosure, the block chain network verifies data received from the plurality of stakeholders with the past data and the interaction at the block chain network with the processor. In addition, the block chain network adds a ledger in the decentralized shared ledger in the block chain network with the processor. The verification is done after receiving a request from the plurality of stakeholders to add the one or more users associated with the device IPs, the device Id's, the device type or the publishers in the blacklist. The addition to the decentralized shared ledger is done based on the smart contracts after verifying that the device IPs, the device Id's, the device type or the publishers is fraud. The addition is done in real time.

In an embodiment of the present disclosure, the block chain network rewards at least one of the plurality of stakeholder for providing data related to fraud which has been verified and added to the blacklist of the decentralized shared ledger at the block chain network with the processor. The reward is updated timely in real time.

In a third example, a non-transitory computer-readable storage medium is provided. The computer executable instructions that, when executed by at least one processor, performs a method. The method creates decentralized repository of fraud IP and publishers using block chain. The method includes a first step of creating a central repository for decentralized shared ledger at a computing device. The method includes another step of adding a ledger in decentralized shared ledger for each interactions on an application in real time at the computing device. The method includes another step of authorizing at least one of the plurality of stakeholders to access the decentralized shared ledger to the computing device. The method includes yet another step of analyzing the interaction and past data received from the plurality of stake holders at the computing device. The method includes yet another step of blocking device IPs, device Id's, device type and the publishers mentioned in blacklist of the decentralized shared ledger at the computing device. The central repository includes blacklist and whitelist. The blacklist and the whitelist are created based on the data collected from a plurality of stakeholders related to fraud. Each of the interactions is associated with one or more advertisements displayed on one or more media devices. The addition is done based on a smart contract. The authorization is done after receiving a request from at least one of the plurality of stakeholders. The authorization is done based on a unique root key. The analysis is done to identify the fraud behavior. The analysis is done in real time. The blacklist is created based on scoring of the publishers in real time.

BRIEF DESCRIPTION OF DRAWINGS

Figure 1:
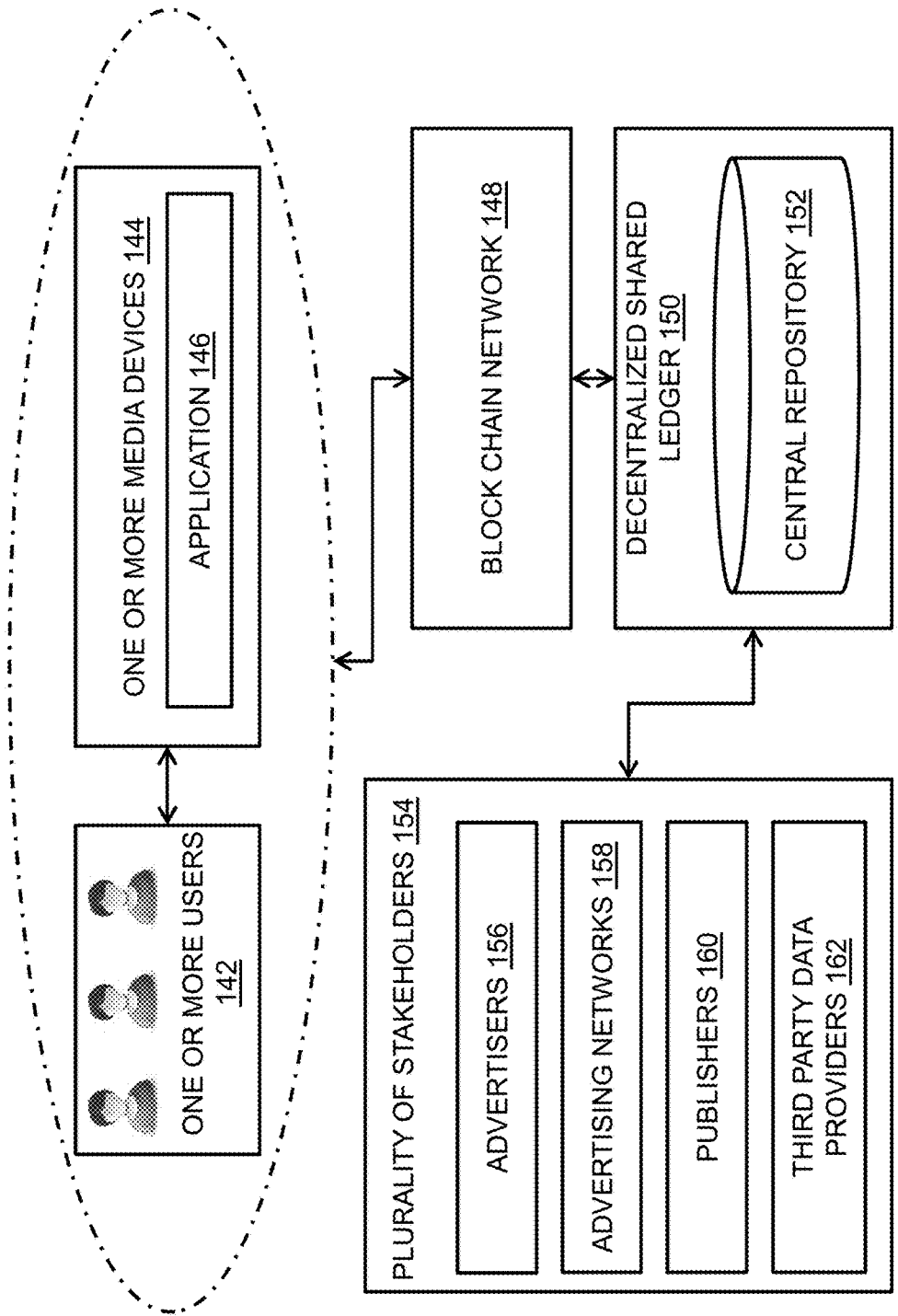
Figure 2:
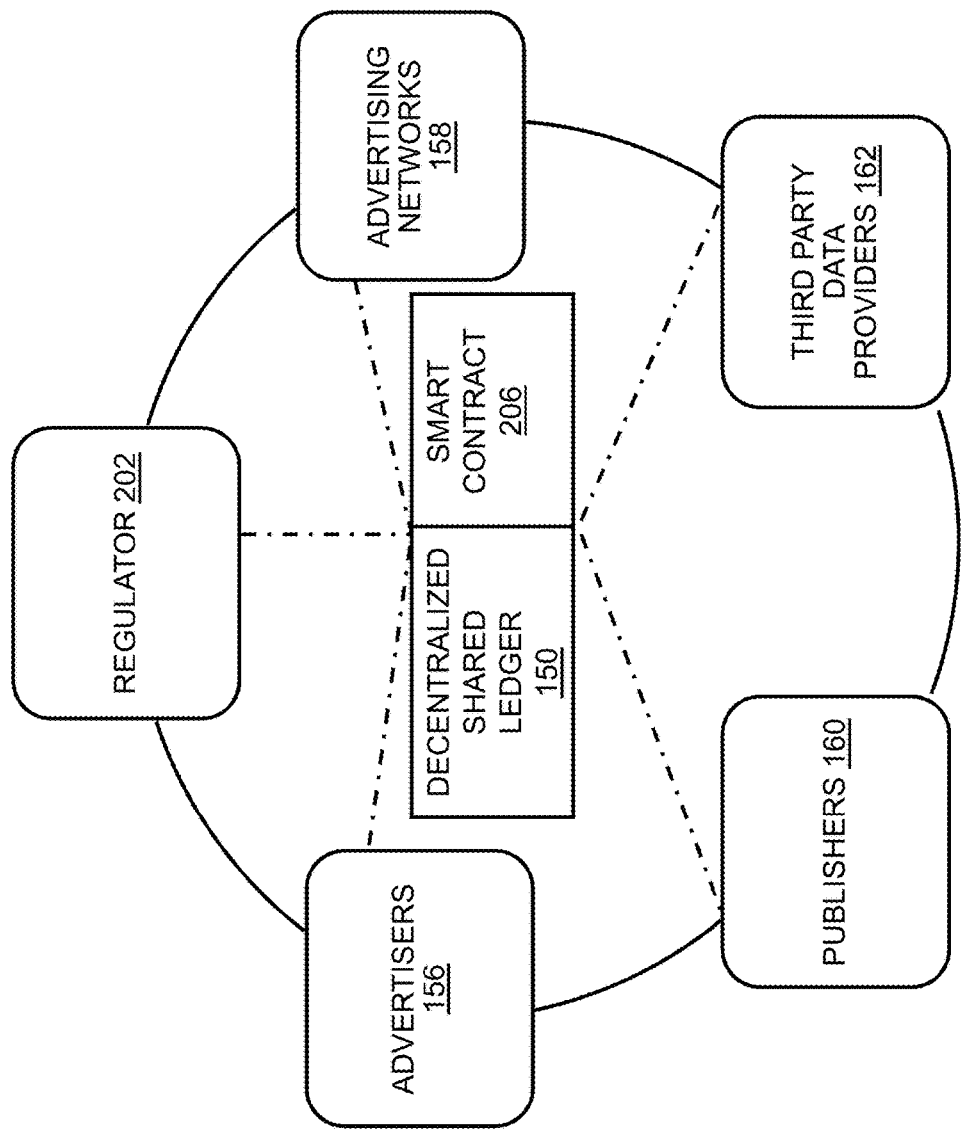
Figure 3:
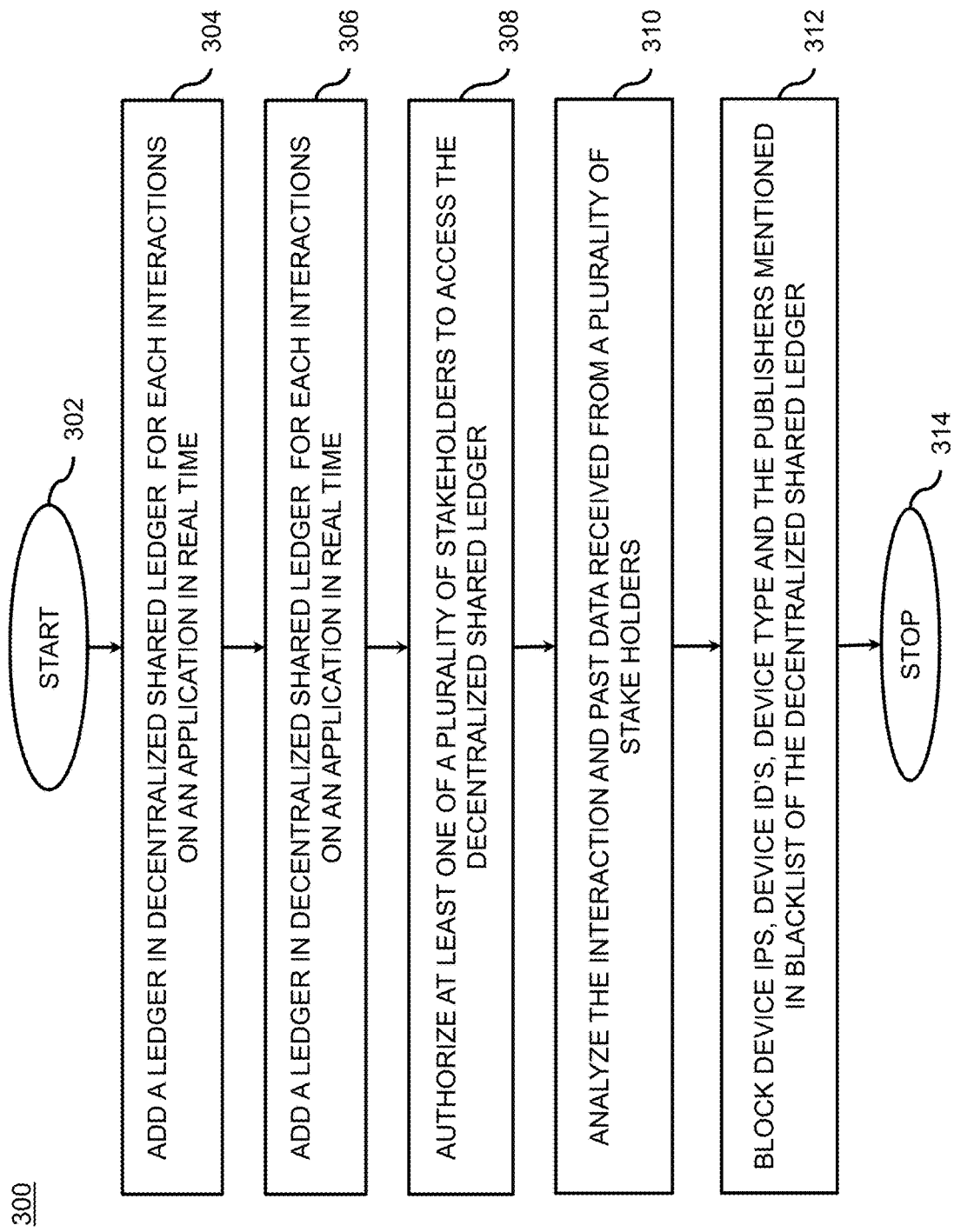

Having thus described the invention in general terms, references will now be made to the accompanying figures, wherein:

FIG. 1 illustrates an interactive computing environment for creation of decentralized repository for stakeholders using block chain, in accordance with various embodiments of the present disclosure;

FIG. 2 illustrates a block diagram of a block chain system, in accordance with various embodiments of the present disclosure;

FIG. 3 is a flowchart for creation of decentralized repository for stakeholders using the block chain, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an interactive computing environment 100 for creation of a decentralized repository for a plurality of stakeholders 154 using block chain. The interactive computing environment 100 shows the interaction between multiple entities for creation of a decentralized shared ledger 150. Further, the interactive computing environment 100 shows the interaction between various entities for the creation of the decentralized repository of fraud IPs and publishers 160. The interactive computing environment 100 shows creation and utilization of the decentralized data by the plurality of stakeholders 154 for prevention of fraud performed by one or more users 142 or the publishers 160.

In general, block chain is a continuously growing list of records, called blocks, which are linked and secured using cryptography. The block chain uses cryptography in order to securely transfer data and each block of the block chain contains a hash of previous block, a timestamp, and data. The block chain helps secure and record data efficiently for transmission when needed by the one or more users 142. The block chain helps to create a more secure collection of data by using cryptography such that data does not get affected by external means.

The interactive computing environment 100 includes the one or more users 142, one or more media devices 144, an application 146 and a block chain network 148. In addition, the interactive computing environment includes a decentralized shared ledger 150, a central repository 152 and the plurality of stakeholders 154. Each of the components of the interactive computing environment 100 interacts with each other to create the decentralized repository of fraud IPs and publishers 160. The interactive computing environment 100 aids in tackling an online advertisement fraud in the application 146 on the one or more media devices 144 in real-time.

The online advertisement fraud in mobile applications refers to use of fraudulent techniques by the publishers 160 in order to generate fake online traffic. The online traffic is faked through techniques such as click fraud, transaction fraud and the like. The click fraud refers to the generation of fraudulent clicks through online bots which are not identifiable to advertisers 156 who treat the same as genuine online traffic. The transaction fraud refers to enabling mobile application installs by providing some incentive to the one or more users 142 in real time or making claims of initiating the install via fake clicks and bots.

In addition, the interactive computing environment 100 includes the one or more users 142 who is any person present at any location and access the multimedia content. The one or more users 142 is any legal person or natural person who access online multimedia content and need an IP based network for accessing the multimedia content. In addition, the one or more users 142 are individual or person who accesses online multimedia content on the respective one or more media devices 144. Further, the one or more users 142 may be a computer or bots programmed to view one or more advertisements and performs click and transaction in order to do fraud. In an embodiment of the present disclosure, the one or more users 142 includes but may not be limited to a natural person, legal entity, individual, machine, bot and robots for viewing the one or more advertisements. The one or more users 142 are associated with the one or more media devices 144.

Further, the interactive computing environment 100 includes the one or more media devices 144 which is used for entertainment purposes and helps to communicate information. The one or more media devices 144 includes but may not be limited to a Smartphone, a laptop, a desktop computer, a tablet and a personal digital assistant. In an embodiment of the present disclosure, the one or more media devices 144 include a smart television, a workstation, an electronic wearable device and the like. In an embodiment, the one or more media devices 144 include portable communication devices and fixed communication devices. In an embodiment of the present disclosure, the one or more media devices 144 are currently in the switched-on state. The one or more users 142 are accessing the one or more media devices 144 in real time. The one or more media devices 144 are any type of devices having an active internet.

In an embodiment of the present disclosure, the one or more media devices 144 are internet-enabled devices for allowing the one or more users 142 to access the media content. In another embodiment of the present disclosure, the one or more media devices 144 allow the one or more users 142 to access the media content already stored on the one or more media devices 144. The media content is already stored in the one or more media devices 144 which get synchronized when the one or more media devices 144 gets connected to the internet. In an embodiment of the present disclosure, the one or more users 142 may be an owner of the one or more media devices 144. In another embodiment of the present disclosure, the one or more users 142 are not the owner of the one or more media devices 144. In addition, the one or more media devices 144 are used for viewing an application 146 installed on the one or more media devices 144.

The application 146 is used for viewing content on the one or more media devices 144. The application 146 includes but may not be limited to mobile application, web application, smart TV application, and website. The application 146 is the mobile application which displays content to the one or more users 142 on the one or more media devices 144. In an embodiment of the present disclosure, the application 146 is any other application which displays content to the one or more users 142 on the one or more media devices 144. The content may include the publishers 160 content, one or more video content and the like. The application 146 accessed by the one or more users 142 shows content related to the interest of the one or more users 142. In an example, the one or more users 142 may be interested in watching online videos, reading blogs, play online games, accessing social networking sites and the like.

The application 146 is developed by application developer for viewing or accessing specific content. The application 146 is advertisement supporting applications which are stored on the one or more media devices 144. The application 146 is of any type which includes gaming application, a utility application, a service based application and the like. The application 146 provides space, frame, area or a part of their application pages for advertising purposes referred to as advertisement slots. The application 146 consists of various advertisement slots which depend on the choice of the publishers 160.

The publishers 160 are the owner of the application 146 which is presented to the one or more users 142 on the one or more media devices 144. Publisher of the publishers 160 is one of the plurality of stakeholders 154 present in the creation and handling of the decentralized repository. The publishers 160 are those who provide media content to the one or more users 142 for viewing on the one or more media devices 144. The publishers 160 in order to generate more revenue advertise products, services or businesses to the one or more users 142. The publishers 160 display the one or more advertisements on the one or more media devices 144 when the one more users 142 are accessing the application 146.

The one or more advertisements are a graphical or pictorial representation of the information in order to promote a product, an event, service and the like. In general, the one or more advertisements are a medium for promoting a product, service, or an event. The one or more advertisements include text advertisement, video advertisement, graphic advertisement and the like. The one or more advertisements are displayed in third-party applications developed by application developers. The one or more advertisements are presented for attracting the one or more users 142 based on the interest in order to generate revenue. The one or more advertisements are presented to the one or more users 142 based on the interest of the one or more users 142 and shown for a specific period of time. The one or more users 142 clicks on the one or more advertisement and the one or more users 142 is re-directed to a website or application or application store associated with the clicked one or more advertisements. The one or more advertisements are served based on a real-time bidding technique or a direct contract between the advertisers 156 and the publishers 160.

The one or more advertisements are provided to the publishers 160 by the advertisers 156 or advertising networks 158 who want to advertise their product, service through the publishers 160. The publishers 160 gets paid if the one or more users 142 visit website or install application of the advertisers 156 or the advertising network 158 through the one or more advertisements. The number of users who visits the one or more advertisements through the application 146 generates more revenue for the publishers 160.

The advertisers 156 are those who want to advertise their product or service and the like to the one or more users 142. The advertisers 156 approach the publishers 146 directly and provide the one or more advertisements to be displayed for the one or more users 142 on the application 146. The advertisers 156 pay the publishers 160 based on the number of users being redirected or taking the product or services provided by the advertisers 156. The advertisers provide the advertisements to advertising networks and information associated with advertising campaigns.

The advertising networks 158 are those which provide advertising services to other people. The advertising networks 158 are entities that connect the advertisers 156 to websites and the publishers 160 that are willing to serve advertisements. The advertising networks 158 act as a mediator between the advertisers 156 and the publishers 160. The advertisers 156 who want to advertise their product or services approach the advertising networks 158 with the one or more advertisements related to the advertising campaigns. The advertising networks 158 connect to the publishers 160 for publishing the one or more advertisement one the one or more media devices 144 for the advertisers 156. The advertising networks 158 buy ad space for the advertisers 156 in real-time. The advertising networks 158 pay the publishers 160 for showing the one or more advertisements on the application 146 of the publishers 160. The advertising networks 158 get paid by the advertisers 156 for advertising the products and services of the advertisers 156. By using the advertising networks 158 it becomes easier for the advertisers 156 for advertising as the advertising networks 158 becomes the single point of contact for the advertisers 156. The advertising networks 158 acknowledge rules placed by the advertisers 156 on global and campaign levels to limit the advertisement content which is sent to the publishers 160. In an embodiment of the present disclosure, the advertising networks 158 monitors the fraud being performed by the publishers 160 and adds the detail for addition to the blacklist. In another embodiment of the present disclosure, the advertising networks 158 monitors the fraud being performed by the publishers 160 and send the detail for addition to blacklist. The advertising networks 158 are one of the plurality of stakeholders 154 involved in creation and accessing of the decentralized repository. The advertising networks 158 enable display of the one or more advertisements in real-time on the application 146 on behalf of the advertisers 156.

The plurality of stakeholders 154 is the persons involved in the advertisement industry. The plurality of stakeholders 154 is related to the distribution, creation and display of the one or more advertisements on the one or more media devices 144. The plurality of stakeholders 154 includes the advertisers 156, the advertising networks 158, the publishers 160 and third party data providers 162 and the like. The plurality of stakeholders 154 is involved in the display of the one or more advertisement on the one or more media devices 144 on the application 146. The plurality of stakeholders 154 is associated with the decentralized shared ledger 150.

The third party data providers 162 are those platforms which provide data related to the one or more users 142 or the publishers 160. The third party data providers 162 are at least one of the plurality of stakeholders 154 which uses the decentralized shared ledger 150 to identify fraud. Further, the third party data providers 162 grant access to third party databases to provide past data of the one or more users 142 or the publishers 160. The third party data providers 162 also provide the list of fraud device IPs, device Id's, device type and the publishers 160. In an embodiment of the present disclosure, the third party data providers 162 list of the one or more users 142 or the publishers 160 which are performing fraud for addition to the blacklist. In an embodiment of the present disclosure, the third party data providers 162 are allowed to directly add the one or more uses 142 in the blacklist and the whitelist. In an embodiment of the present disclosure, the third party data providers 162 are those which can participate in the reward for providing information of fraud by the one or more users 142 or the publishers 160.

The decentralized shared ledger 150 is a ledger containing a plurality of lists. The plurality of lists includes data associated with the publishers 160 and the one or more users 142. The decentralized shared ledger 150 includes multiple ledgers connected to each other. Each ledger contains multiple blocks having information associated with the publishers 160 and the one or more users 142 which is associated with the fraudulent and non-fraudulent behavior. The decentralized shared ledger 150 is based on the block chain technology. In general, the block chain technology is used to create blocks of information associated with the fraudulent and the non-fraudulent data related to the publishers 160 and the one or more users 142. Each block contains a set of information associated with the publishers 160 and the one or more users 142. Each block is connected to or linked to a previous block using a hash address. The block chain system is operated on a number of computer nodes that make up the ledger. Here, the computer nodes correspond to computer systems associated with the plurality of stakeholders 154 who share the decentralized shared ledger 150.

The decentralized shared ledgers 150 include a record of the blacklist and whitelist. The publishers 160 and the one or more users 142 are entered into the blacklist or the whitelist based on device IPs, device Id's, device type and the publishers 160. The blacklist is the list of the publishers 160 and the one or more users 142 who are using fraud means on the one or more advertisements to generate fake click, fake install, and fake transaction. The whitelist is the list of the publishers 160 and the one or more users 142 who are genuinely showing the one or more advertisements on the one or more media devices 144. The decentralized shared ledger 150 is a private ledger which allows access only to registered people. In an embodiment of the present disclosure, the decentralized shared ledger 150 is a public ledger which allows anyone to join and access the decentralized shared ledger 150. The decentralized shared ledger 150 includes the central repository 152.

The central repository 152 is a central place in the decentralized shared ledger 150 where data is stored and maintained. In general, the central repository 152 is a place where multiple databases or files are located for distribution over a network. In addition, the central repository 152 is a location that is directly accessible to the plurality of stakeholders 154 without having to travel across a network. The central repository 152 includes the location information of each block in the block chain system for easy access by the plurality of stakeholders 154.

Further, the interactive computing environment 100 includes the block chain network 148 which is associated with the applications 146 in real-time. The block chain network 148 is a platform which performs tasks such as creating the ledger, authorizing the plurality of stakeholders 154 for accessing the decentralized shared ledger and the like. The block chain network 148 blocks the publishers 160 or the one or more users 142 showing fraudulent behavior or whose device IPs, device Id's, device type is mentioned in the blacklist.

The block chain network 148 connected to the application 146 receives interactions associated with the one or more advertisements which are displayed on the one or more media devices 144. The interactions are received when the one or more advertisements associated with the plurality of stakeholders 154 are displayed in real-time on the one or more media devices 144.

The block chain network 148 performs addition of a ledger in the decentralized shared ledger 150 for each of the interactions on an application. The each of the interaction is associated with the one or more advertisements displayed on the one or more media devices 144. The addition into the decentralized shared ledger 150 is done based on smart contract 206 which is shown in FIG. 2. The smart contract 206 is a self-executing contract with terms of the agreement to add a block or the ledger in the block chain of the decentralized shared ledger 150. The addition of the ledger in the decentralized shared ledger 150 of the block chain is done if the smart contract 206 is passed otherwise the ledger is not added in the decentralized shared ledger 150.

The interactions includes application size, time to download, time to run, redirection time, click to install, click to run and the like. In an embodiment of the present disclosure, the interactions include user click time, device load time, time to run, time to install, network download time and the like. In another embodiment of the present disclosure, the interactions include but may not be limited to application usage time, application idle time and application opening time. In another embodiment of the present disclosure, the interactions include but may not be limited to number of click, past revenue of publisher, number of transaction and time stamp. In another embodiment of the present disclosure, the interactions include location of click, interaction data, number of installs and the like.

In addition, the block chain network 148 receives a request from at least one of the plurality of stakeholders 154 to access the decentralized shared ledger 150. The block chain network 148 performs authorization of at least one of the plurality of stakeholders 154 to access the decentralized shared ledger 150. The authorization of the at least one of the plurality of stakeholders 154 is done based on the unique root key which is specific to each of the plurality of stakeholders.

Further, the block chain network 148 receives past data from the plurality of stakeholders 154. The past data includes the interaction data which was collected from the advertisers 156, the advertising networks 158, the publishers 160 and the third party data providers 162. The past data includes data related to the previous interaction of the one or more users 142 or the publishers 160 on the application 146 of the plurality of stakeholders 154.

Furthermore, the block chain network 148 analyzes the interaction and the past data to identify the fraud behavior. The analysis is done by using the past data received from the plurality of stakeholders 154. The analysis is done in real-time. In an embodiment of the present disclosure, the analysis is done using one or more machine learning algorithm. In another embodiment of the present disclosure, the analysis is done based on training data. The training data is created using machine learning to identify usual behavior of the click and transaction for the one or more advertisements.

Moreover, the block chain network 148 creates the central repository 152 for the decentralized shared ledger 150. The central repository 152 includes the blacklist and whitelist. The blacklist and the whitelist ledgers are created based on the data collected from the plurality of stakeholders 154 related to fraud. The ledgers for the blacklist and the whitelist are maintained in the central repository 152 so that the plurality of stakeholders 154 can easily access the collected data.

Also, the block chain network 148 performs scoring of the publishers 160 or the one or more users 142 based on the analysis. The scoring is done to mark the behavior of the publishers 160 or the one or more users 142. The marking of the publishers 160 or the one or more users 142 is done to identify the unusual behavior based on the analysis. The scoring is done to compare the scoring of the publishers 160 with a pre-defined threshold in order to mark the publishers 160 in the blacklist or the whitelist. The pre-defined threshold is provided by the plurality of stakeholders 154 which defines the threshold for the usual behavior of the publishers 160 or the one or more users 142.

The scoring is compared with the pre-defined threshold to identify the behavior of the publishers 160 and the one or more users 142. If the score for the publishers 160 or the one or more users 142 is higher than the pre-defined threshold than the publishers 160 or the one or more users 142 are marked in the blacklist. If the score for the publishers 160 or the one or more users 142 is less than the pre-defined threshold than the publishers 160 or the one or more users 142 are marked in the whitelist of the decentralized shared ledger 150.

Also, the block chain network 148 blocks IPs, device Id's, device type of the one or more users 142 or the publishers 160 mentioned in the blacklist of the decentralized shared ledger 150. The blocking is done to block the publishers 160 from showing the one or more advertisements on the one or more media devices 144.

Also, the block chain network 148 associated with the decentralized shared ledger 150 receives a request from the plurality of stakeholders 150. The request is send by the plurality of stakeholders 154 to add one of the device IPs, the device Id's, the device type or the publishers 160 to the blacklist who is performing fraud. Further, the block chain network 148 verify the data received with the request to add the one of the device IPs, the device Id's, the device type or the publishers 160 to the blacklist. The verification is done to identify if the fraud is committed by the publishers 160, the device IPs, the device Id's and the device type mentioned by the plurality of stakeholders 154. The verification is done by analyzing the data received from the plurality of stakeholders, the past data and the interaction.

Also, the block chain network 148 associated with the decentralized shared ledger 150 adds the publishers 160, the device IPs, the device Id's or the device type to the decentralized shared ledger 150. The publishers 160, the device IPs, the device Id's or the device type is added to the decentralized shared ledger 150 if found fraud. The addition to the decentralized shared ledger 150 is done after verification that the publishers 160, the device IPs, the device Id's or the device type is fraud. The addition is done by adding a record or ledger in the blacklist of the block chain of the decentralized shared ledger 150. The addition is done in real time. Each of the plurality of stakeholders 154 may access the block or ledger through computer node by using the unique root key provided to each of the plurality of stakeholders 154. The unique root key allows each of the plurality of stakeholders 154 to access only that part of the decentralized shared ledger 150 which he is allowed to access.

Also, the block chain network 148 associated with the decentralized shared ledger 150 rewards one of the plurality of stakeholder 154 who provides data related to fraud. The reward is provided after verification that the fraud is being committed 150 by the publishers 160, the device IPs, the device Id's or the device type. The reward is updated timely as the data becomes old reward is reduced. The reward is provided to one of the plurality of stakeholders 154 who send the request to add data in the blacklist of the block chain network 148. In an embodiment of the present disclosure, the reward is provided for a particular time period after which no reward is provided to the one of the plurality of stakeholders 154 for the data. In an embodiment of the present disclosure, the reward is provided to one of the plurality of stakeholders 154 scales down as the data becomes old and new data is added to the block chain network 148. In an embodiment of the present disclosure, the reward is calculated based on the smart contract using saving which occur after adding the publishers 160, the device IPs, the device Id's or the device type to the blacklist.

In an embodiment of the present disclosure, the block chain network 148 associated with the decentralized shared ledger 150 allows the publishers 160 to make a request for removal from the blacklist. In an embodiment of the present disclosure, the publishers 160 is removed from the blacklist after receiving a acceptance of smart contract to restrain from performing fraud. In another embodiment of the present disclosure, the publisher of the publishers 160 is removed from the blacklist after receiving a security deposit or penalty for performing fraud.

In another embodiment of the present disclosure, the publishers 160 is removed from the blacklist after receiving a confirmation of sharing access to third part audit tools, internal code review and the like. In another embodiment of the present disclosure, the publishers 160 is removed from the blacklist after receiving a confirmation of transparency of ad, permission to view internal code, and the like.

In another embodiment of the present disclosure, the block chain network 148 associated with the decentralized shared ledger 150 allow the advertisers 156 to select the publishers 160 from the whitelist. The selection of the publishers 160 is done for the one or more advertisements campaigns. The selection of the publishers 160 is done to reduce the occurrence of fraud in the one or more advertisements campaigns.

In another embodiment of the present disclosure, the decentralized shared ledger 150 transmits information associated with the publishers 160 or the one or more users 142 to third party in real time. In another embodiment of the present disclosure, the decentralized shared ledger 150 updates the interactions, the past data, the pre-defined threshold and the score in real-time. In another embodiment of the present disclosure, the decentralized shared ledger 150 stores the interactions, the past data, the pre-defined threshold and the score in real-time.

In another embodiment of the present disclosure, the decentralized shared ledger 150 updates data in the central repository 152 in real time for accessing by the plurality of stakeholders 154. In another embodiment of the present disclosure, the decentralized shared ledger 150 creates multiple block chains of blacklisted and whitelisted publishers 160 or the one or more users 142 in real-time.

FIG. 2 illustrated a block diagram 200 of the decentralized shared ledger 150 for creating the decentralized repository 152, in accordance with various embodiments of the present disclosure. The reference will now be made to the embodiments shown in FIG. 1 to explain various embodiments of FIG. 2. The block diagram 200 shows the block chain for the plurality of stakeholders 154. The block diagram 200 includes the advertisers 156, the advertising networks 158, the publishers 160 and the third party data providers 162. In addition, the block diagram 202 includes the decentralized shared ledger 150, the smart contract 206 and the regulator 202.

The block chain is continuously fed data for forming the decentralized shared ledger 150. Each of the plurality of stakeholders 154 has access to the decentralized shared ledger 150 stored with them for real-time access. The block chain allows the advertisers 156, the publishers 160, the third party fraud providers 162 and the advertising networks 158 to share the block or the ledger of the block chain. The block or the ledger which is shared includes the blacklist and the whitelist of the device IPs, device Id's, device type and the publishers 160. In addition, the block chain forms multiple types of ledgers. The multiple types of ledgers are formed based on data from the plurality of stakeholders 154 and other entities.

The regulator 202 is a block chain network operator. The regulator 202 regulates the access to the block chain for the advertisers 156, the publishers 160, the advertising networks 158 and the third party data providers 162. The regulator 202 is a party that creates the ledgers for the block chain. The regulator 202 allows access to the block chain based on the smart contract 206 between the plurality of stakeholders 154 and the block chain network operator. The regulator 202 allows access to the block chain based on the smart contract 206 which can be updated by the regulator 202. The sharing of the ledger for the advertisers 156, the publishers 160, the advertising networks 158 and the third party data providers 162 is controlled by the regulator 202. The addition of the block or the ledger in the block chain is controlled by the regulator 202 which execute the smart contract for check the access right for the making changes to the block chain. The block chain allow the advertisers 156, the publishers 160, the advertising networks 158 and the third party data providers 162 to access the block chain through a computer node. The computer node is used by the advertisers 156, the publishers 160, the advertising networks 158 and the third party data providers 162 for accessing the distributed shared ledger 150. The block chain network operator or the regulator 202 is an individual who has special permissions to create, manage and monitor the block chain ledger.

Each ledger of the multiple types of ledgers is updated simultaneously across all participating parties (nodes). In an embodiment of the present disclosure, each stakeholder from the plurality of stakeholders 154 can initiate submission of an asset or the ledger and share the updated ledger with each of the plurality of stakeholders 154. The authentication is based on an asymmetrical private system. In an embodiment of the present disclosure, the authentication is based on an asymmetrical public system. The unique root key is generated from well-known and trusted certificate authorities. Each of the plurality of stakeholders 154 is required to create an identity in the block chain.

Further, each ledger contains a set of information which is shared with the plurality of stakeholders 154 who are authorized for the access the block chain of the decentralized shared ledger 150. Each ledger contains multiple blocks forming a block chain. Each ledger is the block chain of the blacklist and the whitelist device IPs, Device Types, the publishers 160 and the one or more users 142. In an embodiment of the present disclosure, the decentralized shared ledger 150 include different ledger for each type of ledgers. In another embodiment of the present disclosure, the ledger may be a single ledger containing information for each type of ledgers.

The set of information in each type of ledgers includes ID of item, submitter, the blacklist flag/whitelist flag/acknowledged, filter for blacklist/whitelist, a timestamp and a previous block chain item. In addition, the filter for the blacklist or the whitelist may include one or more of the following items. The items include device types, device IDs, IP addresses and the publishers 160.

| Id | Submitter | Flag | Filter | Timestamp | Previous Id |
|---|---|---|---|---|---|
| 1 | Entity A | Blacklist | Pub A | 1 Feb 2017 2:54:12 | — |
| 2 | Entity B | Blacklist | Pub B, IP: 123.123.123.123 | 1 Feb 2017 2:55:24 | 1 |
| 3 | Entity A | Acknowledge | — | 1 Feb 2017 2:56:45 | 2 |

The above-shown table shows a cut-down example of the ledger. The table includes a first entry which shows that entity A has blacklisted publisher A along with the timestamp and the previous ID. The table includes a second entry which shows that entity B has blacklisted all users going to publisher B from the IP address 123.123.123.123. The table includes a third entity which shows that the entity A has acknowledged the second entry made by Entity B. The acknowledgement done by Entity A enforces the fact that Entity A has seen the previous entries and ensures transparency. The acknowledgement is used to determine and limit stakeholders who may not be following the rules. In an embodiment of the present disclosure, the ledger may contain reason codes, links to the smart contract 206 and descriptions.

In an embodiment of the present disclosure, the plurality of stakeholders 154 can generate specific lists. In an example, the advertisers 156 create a special ledger. The special ledger with the list can be either open or tied to specific entities (stakeholders). The authorization to the special ledger is controlled by the regulator 202. The regulator 202 is configured to perform a plurality of actions. The plurality of actions includes regulating access to the lists to each of the plurality of stakeholders 154 within the block chain and ensuring that only authorized lists are shown to the plurality of stakeholders 154. In addition, the regulator 202 may perform mining algorithms and/or manage settings and configurations. The regulator 202 limits a length of timeframe until items in the block chain are accepted for the complexity of miners. The regulator 202 stores the configuration and scoring mechanisms that are associated with the lists from the owner of the ledger.

FIG. 3 illustrates a flow chart 300 for creating a decentralized repository of fraud IPs and publishers accessible in real time, in accordance with various embodiments of the present disclosure. It may be noted that to explain the process steps of flowchart 300, references will be made to the system elements of FIG. 1 and FIG. 2. It may also be noted that the flowchart 300 may have fewer or more number of steps.

The flowchart 300 initiates at step 302. Following step 302, at step 304, the block chain network 148 creates the central repository 152 for the decentralized shared ledger 150. At step 306, the block chain network 148 adds a ledger in decentralized shared ledger for each interactions on an application in real time. At step 308, the block chain network 148 authorizes at least one of a plurality of stakeholders to access the decentralized shared ledger. At step 310, the block chain network 148 analyzes the interaction and past data received from a plurality of stake holders. At step 312, the block chain network 148 blocks device IPs, device id's, device type and the publishers mentioned in blacklist of the decentralized shared ledger. The flow chart 300 terminates at step 314.

FIG. 4 illustrates a block diagram of a device 400, in accordance with various embodiments of the present disclosure. The device 400 is a non-transitory computer readable storage medium. The device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the device 400 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The device 400 includes the one or more processors 406 that read data from various entities such as memory 404 or I/O components 412. The one or more presentation components 408 present data indications to the user or other device. Exemplary presentation components include a display device, speaker, printing component, vibrating component, etc. The one or more I/O ports 410 allow the device 400 to be logically coupled to other devices including the one or more I/O components 412, some of which may be built in. Illustrative components include a microphone, joystick, gamepad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer system comprising:
   one or more processors; and
   a memory coupled to the one or more processors, the memory for storing instructions which, when executed by the one or more processors, cause the one or more processors to perform a method for creating a decentralized repository of fraud related IP addresses and publishers using block chain, the method comprising:
   creating, at a block chain network, a central repository for a decentralized shared ledger, wherein the central repository comprises a blacklist and a whitelist, wherein the blacklist and the whitelist are created based on data collected from a plurality of stakeholders related to fraud, wherein the plurality of stakeholders comprises advertisers, advertising networks, publishers and third party data providers;
   adding, at the block chain network, a ledger in the decentralized shared ledger for each interactions on an application in real time, wherein each of the interactions is associated with one or more advertisements displayed on one or more media devices, wherein the addition is done based on a smart contract;
   authorizing, at the block chain network, at least one of the plurality of stakeholders to access the decentralized shared ledger, wherein the authorization is done after receiving a request from at least one of the plurality of stakeholders, wherein the authorization is done based on a unique root key;
   analyzing, at the block chain network, the interaction and past data received from the plurality of stake holders, wherein the analysis is done to identify the fraud behavior, wherein the analysis is done in real time; and
   blocking, at the block chain network, device IP addresses, device ids, device type and the publishers mentioned in the blacklist of the decentralized shared ledger, wherein the blacklist is created based on scoring of the publishers in real time.

2. The computer system as recited in claim 1, wherein the interactions comprise application size, time to download, time to run, redirection time, click to install, click to run, user click time, device load time, time to install, network download time, application usage time, application idle time, application opening time, number of click, past revenue of publisher, number of transaction, time stamp, location of click, interaction data and number of installs.

3. The computer system as recited in claim 1, wherein the plurality of stakeholders comprises advertisers, advertising networks, the publishers and third party data providers.

4. The computer system as recited in claim 1, wherein the unique root key is specific to at least one of the plurality of stakeholders, wherein the unique root key is used for authorization of each of the plurality of stakeholders.

5. The computer system as recited in claim 1, wherein the decentralized shared ledger comprises one of private ledger and public ledger.

6. The computer system as recited in claim 1, further, comprising scoring, at the block chain network, the publishers based on the analysis, wherein the scoring is done to specify whether the publishers are using fraud means, wherein the scoring is compared with the pre-defined threshold in order to mark the publishers in the whitelist and the blacklist.

7. The computer system as recited in claim 1, wherein the blacklist and the whitelist comprises device IP addresses, device ids, device type and the publishers.

8. The computer system as recited in claim 1, further comprising:
 verifying, at the block chain network, data received from the plurality of stakeholders with the past data and the interaction, wherein the verification is done after receiving a request from the plurality of stakeholders to add the one or more users associated with the device IP addresses, device ids, the device type or the publishers in the blacklist; and
 adding, at the block chain network, a ledger in the decentralized shared ledger, wherein addition to the decentralized shared ledger is done based on the smart contracts after verifying that the device IP addresses, device ids, the device type or the publishers are related to fraud, wherein the addition is done in real time.

9. The computer system as recited in claim 1, further comprising:
 rewarding, at the block chain network, at least one of the plurality of stakeholders for providing data related to fraud which has been verified and added to the blacklist of the decentralized shared ledger, wherein the reward is updated in real time.

10. A computer-implemented method for creating a decentralized repository of fraud related IP addresses and publishers using block chain, the computer-implemented method comprising:
 creating, at a block chain network with a processor, a central repository for a decentralized shared ledger, wherein the central repository comprises a blacklist and a whitelist, wherein the blacklist and the whitelist are created based on data collected from a plurality of stakeholders related to fraud;
 adding, at the block chain network with the processor, a ledger in the decentralized shared ledger for each interactions on an application in real time, wherein each of the interactions is associated with one or more advertisements displayed on one or more media devices, wherein the addition is done based on a smart contract;
 authorizing, at the block chain network with the processor, at least one of the plurality of stakeholders to access the decentralized shared ledger, wherein the authorization is done after receiving a request from at least one of the plurality of stakeholders, wherein the authorization is done based on a unique root key;
 analyzing, at the block chain network with the processor, the interaction and past data received from the plurality of stake holders, wherein the analysis is done to identify the fraud behavior, wherein the analysis is done in real time; and
 blocking, at the block chain network with the processor, device IP addresses, device ids, device type and the publishers mentioned in the blacklist of the decentralized shared ledger, wherein the blacklist is created based on scoring of the publishers in real time.

11. The computer-implemented method as recited in claim 10, wherein the interactions comprise application size, time to download, time to run, redirection time, click to install, click to run, user click time, device load time, time to install, network download time, application usage time, application idle time, application opening time, number of click, past revenue of publisher, number of transaction, time stamp, location of click, interaction data and number of installs.

12. The computer-implemented method as recited in claim 10, wherein the plurality of stakeholders comprises advertisers, advertising networks, the publishers and third party data providers.

13. The computer-implemented method as recited in claim 10, wherein the unique root key is specific to at least one of the plurality of stakeholders, wherein the unique root key is used for authorization of each of the plurality of stakeholders.

14. The computer-implemented method as recited in claim 10, wherein the decentralized shared ledger comprises one of private ledger and public ledger.

15. The computer-implemented method as recited in claim 10, further comprising: scoring, at the block chain network with the processor, the publishers based on the analysis, wherein the scoring is done to specify whether the publishers are using fraud means, wherein the scoring is compared with the pre-defined threshold in order to mark the publishers in the whitelist and the blacklist.

16. The computer-implemented method as recited in claim 10, wherein the blacklist and the whitelist comprises device IP addresses, device ids, device type and the publishers.

17. The computer-implemented method as recited in claim 10, further, comprising:
 verifying, at the block chain network with the processor, data received from the plurality of stakeholders with the past data and the interaction, wherein the verification is done after receiving a request from the plurality of stakeholders to add the one or more users associated with the device IP addresses, device ids, the device type or the publishers in the blacklist; and
 adding, at the block chain network with the processor, a ledger in the decentralized shared ledger, wherein addition to the decentralized shared ledger is done based on the smart contracts after verifying that the device IP addresses, device ids, the device type or the publishers is related to fraud, wherein the addition is done in real time.

18. The computer-implemented method as recited in claim 10, further comprising:
 rewarding, at the block chain network with the processor, at least one of the plurality of stakeholders for providing data related to fraud which has been verified and added to the blacklist of the decentralized shared ledger, wherein the reward is updated in real time.

19. A non-transitory computer-readable storage medium encoding computer executable instructions that, when executed by at least one processor, performs a method for creating a decentralized repository of fraud related IP addresses and publishers using block chain, the method comprising:
- creating, at a computing device, a central repository for a decentralized shared ledger, wherein the central repository comprises a blacklist and a whitelist, wherein the blacklist and the whitelist are created based on data collected from a plurality of stakeholders related to fraud;
- adding, at the computing device, a ledger in the decentralized shared ledger for each interaction on an application in real time, wherein each of the interactions is associated with one or more advertisements displayed on one or more media devices, wherein the addition is done based on a smart contract;
- authorizing, at the computing device, at least one of the plurality of stakeholders to access the decentralized shared ledger, wherein the authorization is done after receiving a request from at least one of the plurality of stakeholders, wherein the authorization is done based on a unique root key;
- analyzing, at the computing device, the interaction and past data received from the plurality of stake holders, wherein the analysis is done to identify the fraud behavior, wherein the analysis is done in real time; and
- blocking, at the computing device, device IP addresses, device ids, device type and the publishers mentioned in blacklist of the decentralized shared ledger, wherein the blacklist is created based on scoring of the publishers in real time.

* * * * *